Feb. 5, 1946.  A. VENDITTY  2,394,276
SWIVEL JOINT
Filed March 17, 1943  2 Sheets-Sheet 2
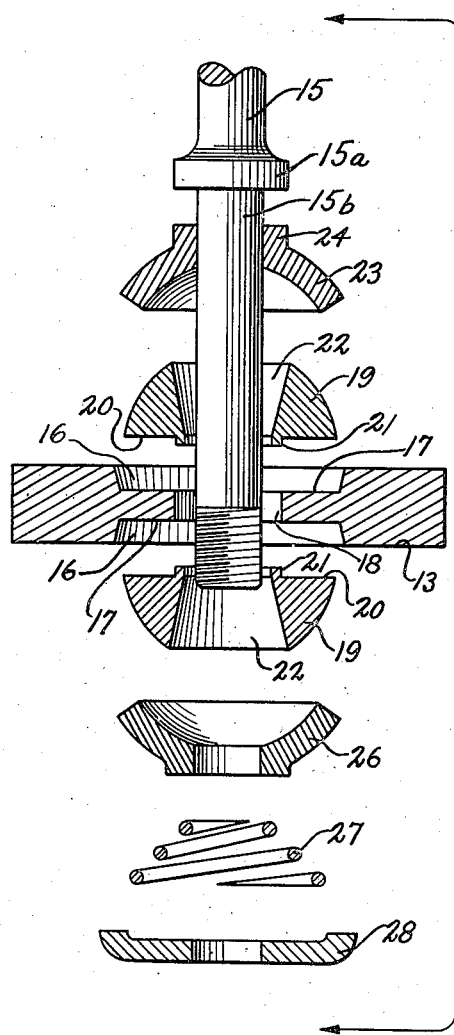
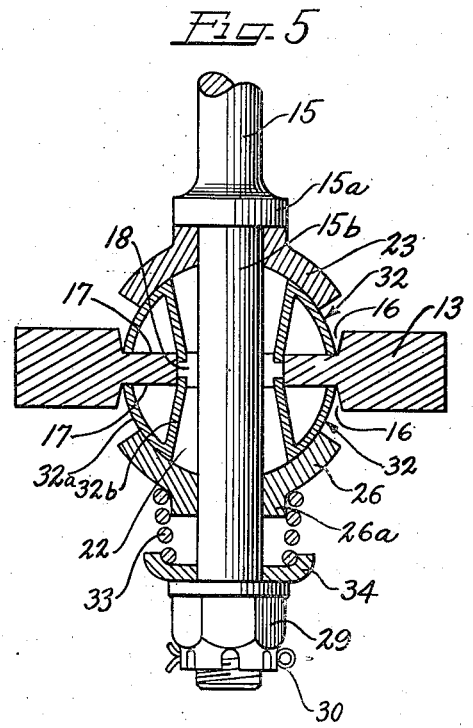
Inventor
ANTHONY VENDITTY
by Charles Hill
Attys.

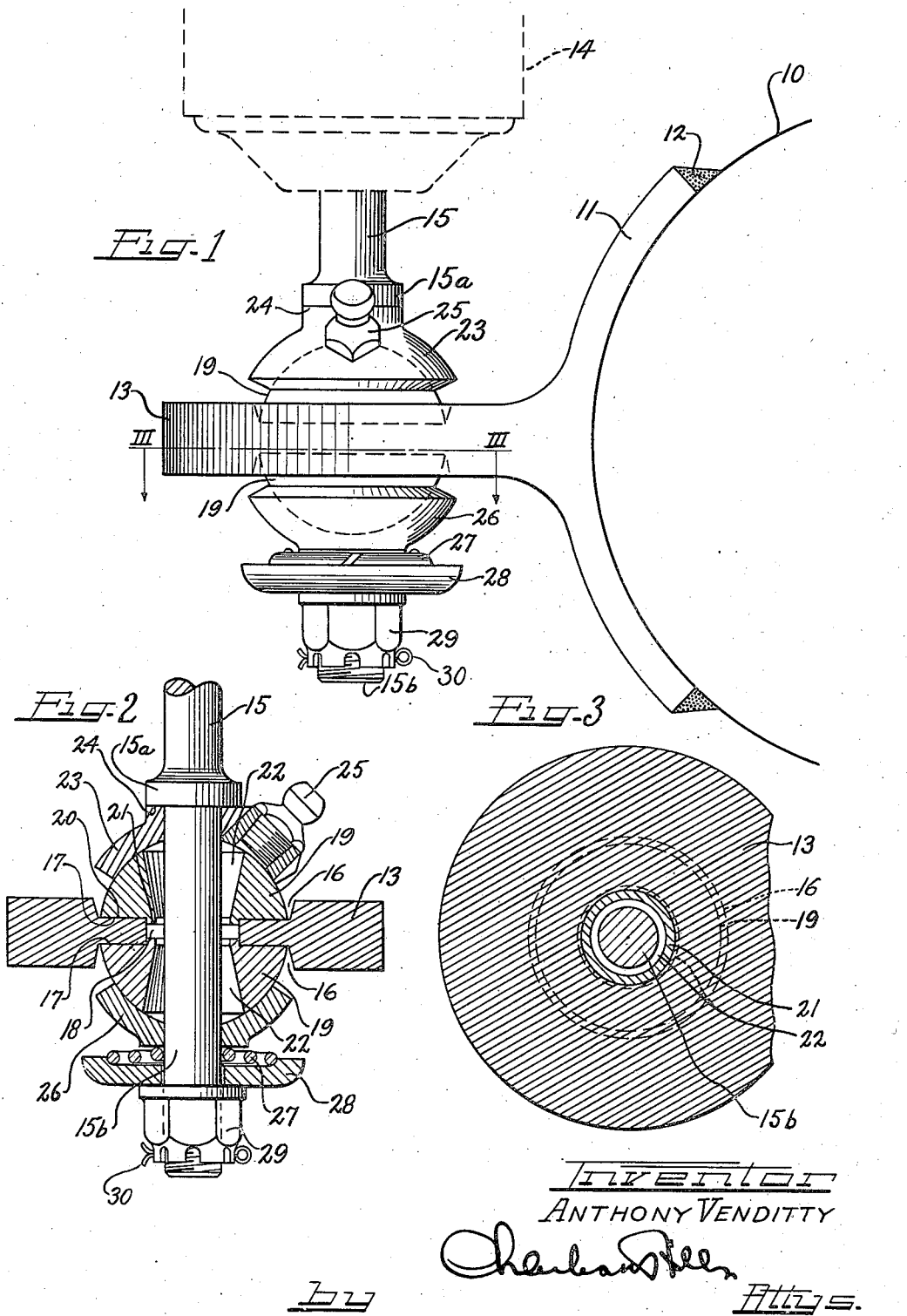

Patented Feb. 5, 1946

2,394,276

UNITED STATES PATENT OFFICE 2,394,276

SWIVEL JOINT

Anthony Venditty, Detroit, Mich., assignor to Thompson Products, Inc., Cleveland, Ohio, a corporation of Ohio Application March 17, 1943, Serial No. 479,426

6 Claims. (Cl. 287—91)

This invention relates to joint constructions especially useful in connecting a shock absorber arm or shaft with an axle-carried bracket.

Specifically, the invention relates to a swivel joint wherein ball segments are seated on opposite faces of a mounting bracket, end caps ride on the ball segments, and a pintle extends through the end caps, ball segments and mounting bracket to hold the assembly together.

According to this invention a mounting bracket has aligned annular recesses in opposed faces thereof receiving ball segments. The bottoms of the recesses are connected through a central aperture. Each ball segment has an axial opening therethrough preferably flaring outwardly from the bottom of the recess in which it is seated. End caps have segmental spherical recesses receiving the ball segments. These caps are adapted to ride on the ball segments. The shaft of a shock absorber extends through the end caps, ball segments and bracket and has an abutment shoulder in spaced relation from the free end thereof for thrusting against one end cap. The free end of the shaft receives a spring retainer therearound and a nut is threaded onto the shaft to hold the retainer on the shaft. A spring acts on the other end cap and is bottomed on this retainer. One of the end caps can carry a lubricant fitting for supplying lubricant directly to the interior of the end cap carrying the same and through the axial openings of the ball segments to the other end cap. Lubricant can also flow between the ball segments and the bottoms of the recesses in the bracket. Thus a single fitting lubricates all working surfaces of the assembly.

It is, then, an object of the invention to provide a swivel joint assembly utilizing ball segments on opposite sides of a mounting bracket together with end caps riding on the ball segments and a pin or shaft holding all of the elements in assembled relation.

A further object of the invention is to provide a swivel joint including ball segments, members riding on the ball segments, and a mounting bracket carrying the ball segments together with a single means holding the members in assembled relation.

A still further object of the invention is to provide a strong simple swivel joint especially adapted for shock absorber links.

Another object of the invention is to provide a swivel joint composed of ball segments seated in recesses on opposite faces of a bracket member, end caps riding on the ball segments, and a pin extending through the end caps, ball segments and bracket to hold the assembly in operating position together with a single lubricating fitting for supplying lubricant to all working surfaces of the joint.

Other and further objects of the invention will be apparent to those skilled in the art from the following detailed description of the annexed sheets of drawings which, by way of preferred examples, illustrate two embodiments of the invention.

On the drawings:

Figure 1 is a side elevational view of a swivel joint according to this invention mounted in position to connect the shaft or operating arm of a shock absorber with an axle housing of a vehicle.

Figure 2 is a vertical cross-sectional view, with parts in elevation, of the swivel joint shown in Figure 1.

Figure 3 is a cross-sectional view, taken along the line III—III of Figure 1.

Figure 4 is an exploded cross-sectional view of all of the parts of the swivel joint shown in Figures 1 to 3.

Figure 5 is a vertical cross-sectional view, with parts in elevation, of a modified form of swivel joint according to this invention.

As shown on the drawings:

In Figure 1 the reference numeral 10 designates an axle housing for a vehicle. A bracket 11 is welded as at 12 onto this axle housing. This bracket 11 has a horizontal shelf-like portion 13 projecting from the axle housing beneath a shock absorber 14. The shock absorber can be of the direct acting bicycle pump type suspended from the body of the vehicle.

The shock absorber 14 has an operating shaft 15 extending through the shelf portion 13 of the bracket 11.

As shown in Figure 2, the shelf portion 13 of the bracket 11 has aligned annular recesses 16 extending inwardly from the top and bottom faces thereof and terminating in flat bottoms 17.

An aperture 18 connects the recesses 16—16 and extends through the central portions of the recesses.

Half-ball members 19—19 are seated in the recesses 16—16 and each ball member has a flat end face 20 bottomed on the flat bottom 17 of a recess. A pilot portion 21 projects from this flat face 20 into the aperture 18. The ball members are thus centered in the recesses.

Each ball member 19 has a tapered hole 22 therethrough flaring outwardly from the pilot portion 21 thereof.

The shaft 15 of the shock absorber 14 has an abutment shoulder 15a thereon together with a pin portion 15b projecting beneath the shoulder 15a and terminating in a threaded free end.

An end cap 23 has a segmental spherical recess receiving a portion of the top ball member 19. The end cap 23 is apertured to receive the pin portion 15b therethrough. An upstanding collar 24 is provided on the end cap 23 to engage the abutment 15a of the shaft.

A lubricant fitting 25 is threaded into a tapped hole in the end cap 23. If the half-ball members 19—19 are composed of oilless bearing material instead of ordinary metals like steel, the lubricant fitting can be eliminated. Suitable oilless bearing materials for the members 19—19 are graphitic bronzes, graphite-loaded hard rubber such as "Baltic" or the like.

A second end cap 26 has a segmental spherical recess receiving the bottom ball segment 19 therein. This end cap 26 is also apertured to receive the pin 15b therethrough.

A coil spring 27 acts on the end cap 26 and is bottomed in a spring retainer 28 disposed around the pin 15b. A castellated nut 29 is threaded on the free end of the pin 15b to hold the retainer 28 on the pin. A cotter pin 30 is passed through the nut 29 and pin 15b to secure the nut in adjusted threaded relation on the pin.

The coil spring 27 is compressed between the retainer 28 and the end cap 26 to act on the end cap 26 for holding the same against the bottom ball segment 19. Since the pin 15b is slidable through the end caps, ball segments and bracket, this spring 27 will also be effective to draw the abutment 15a of the pin against the other end cap 23. Therefore the single spring 27 holds all of the swivel joint parts in operative assembly and acts automatically to take up clearance as wear develops between operating surfaces.

The apertures or bores 22 through the ball segments 19 are larger than the pin 15b so that this pin can tilt in the ball segments. The caps 23 and 26 ride on the ball segments during tilting movement.

Rotation of the pin 15b can either take place in the apertures of the end caps 23 and 26, or these end caps can move with the pin to rotate on the ball segments. In addition, the ball segments could rotate on the bottoms 17 of the recesses.

The swivel joint of Figures 1 to 3 accommodates universal movements between the bracket 11 and shock absorber shaft 15. The joint is readily assembled and is capable of withstanding heavy end thrusts since the ball members 19 are firmly seated over an appreciable area thereof on the bracket member and the caps 23 and 26 extend over an appreciable area of the ball members.

In Figure 5, parts identical with parts described in Figures 1 to 4 have been marked with the same reference numerals. As shown in Figure 5, stamped ball segments 32—32 are used in place of the solid segments 19—19. These segments 32 each have a segmental spherical outer wall 32a bottomed on the bottom 17 of a recess 16 together with a converging tubular skirt 32b extending from the cylindrical wall 32a into the aperture 18 to serve as a pilot portion for centering the segments in the recess 16.

The tubular skirt 32b of course provides the tapered aperture or bore 22 through which the pin 15b freely extends.

The end cap 26 can have an upstanding collar 26a thereon to receive a coil spring 33 therearound. This coil spring 33 can be bottomed in a retainer 34 similar to the retainer 28. The joint of Figure 5 operates in the same manner as the joint of Figures 1 to 4, but is not intended for use where very heavy thrust loads are encountered because the hollow ball segments 32—32 are not as strong as the solid ball segments 19—19.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. A swivel joint comprising a mounting bracket having opposed faces with aligned flat bottomed annular recesses therein, said bracket having an aperture therethrough connecting the central portions of the recesses, a half-ball member bottomed in each recess and having a portion thereof extending into said aperture, said half-ball members having passageways therethrough communicating with the aperture through the bracket, said half-ball members having spherical portions thereof projecting beyond the opposed faces of the bracket, apertured spherically recessed caps on said spherical portions of the half-ball members, a pin extending through the cap apertures, the passageways of the half-ball members, and the bracket aperture, an abutment shoulder on said pin in spaced relation from the end thereof thrusting against one cap, a spring surrounding the end portion of the pin thrusting against the other cap, a spring retainer on said end portion of the pin bottoming said spring, and adjustable means on said pin for acting on said retainer to compress the spring and hold the parts in assembled relation.

2. A swivel joint comprising a mounting bracket having opposed faces with aligned flat bottomed annular recesses therein, said bracket having an aperture therethrough connecting the central portions of the recesses, a half-ball member in each recess having a flat end seated on the flat bottom of the recess, pilot portions on said half-ball members extending into said bracket aperture, said half-ball members having axial bores therethrough communicating with the bracket aperture and spherical portions thereon projecting beyond the opposite faces of the bracket, apertured spherically recessed caps ridable on said spherical portions of the half-ball members, a pin extending through the cap apertures, the bores of the half-ball members, and the bracket aperture, and means on said pin urging the caps toward each other for holding the parts in assembled relation, said pin being tiltable and rotatable relative to said bracket.

3. A joint comprising a bracket having opposed faces with aligned annular recesses therein, ball segments on opposite sides of the bracket each having an end face bottomed in a recess and a side wall guided by the annular side of the recess, a recessed cap seated on each ball segment, a pin extending through said caps, ball segments and bracket, and means on said pin urging the caps toward each other to hold the parts in assembled relation on the bracket.

4. A swivel joint comprising a central member having opposed faces with aligned annular recesses therein, said recesses having flat bottoms, said member being apertured to join the flat bottoms of the recesses at the central portions of the recesses, solid ball segment members having flat end walls seated on the flat bottoms of the recesses and annular upstanding pilot portions extending from said flat end walls into said aperture, said ball segment members having tapered bores therethrough flaring outwardly from said pilot portions thereof, cups seated on said ball segment members, and a pin extending through said ball segment members and aperture holding said cups on the ball segment members.

5. A swivel joint comprising a central member having aligned annular recesses in opposed faces thereof, said member having an aperture therethrough joining the central portions of the recesses, hollow ball segments seated in said recesses and having annular skirt portions projecting into said apertures, a cup ridable on each ball segment, and a pin extending through said cups, said skirts of the ball members, and said aperture holding the parts in assembled relation, said pin being tiltable and rotatable relative to said central member.

6. A shock absorber link comprising a bracket adapted to be secured onto an axle housing, said bracket having a laterally projecting shelf portion, aligned annular recesses extending inwardly from opposite faces of said shelf portion, said shelf portion having an aperture therethrough connecting the central portions of said recesses, ball segments seated in said recesses having openings therethrough normal to said shelf portion, cups ridable on said ball segments, a shock absorber shaft extending through said cups, ball segments and aperture, and means on said shaft urging the cups toward each other to hold the parts in assembled relation.

ANTHONY VENDITTY.